July 28, 1942.  M. UNGER  2,291,360
PRESSURE RELIEF DEVICE
Filed May 22, 1940
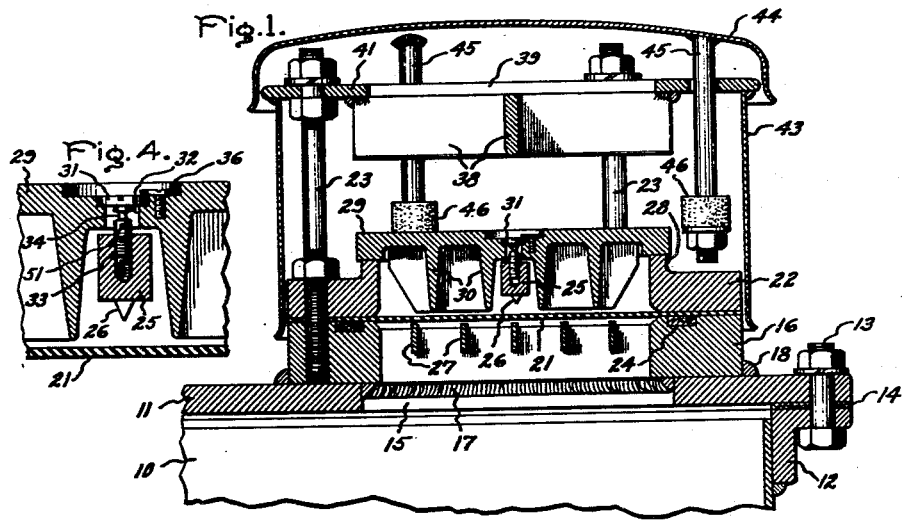
Fig. 1.
Fig. 4.
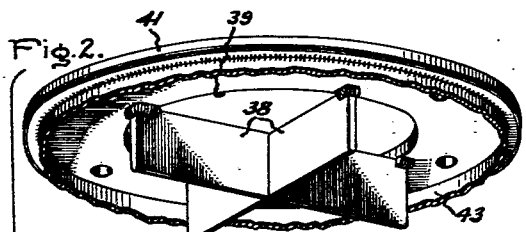
Fig. 2.
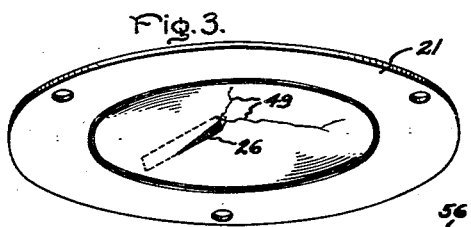
Fig. 3.
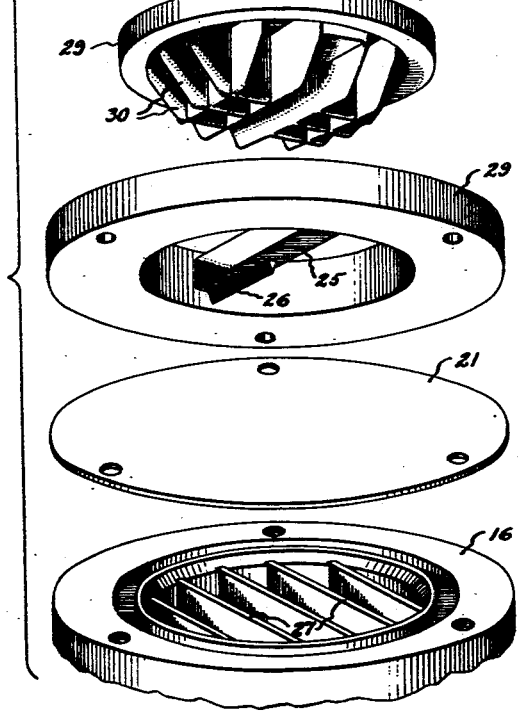
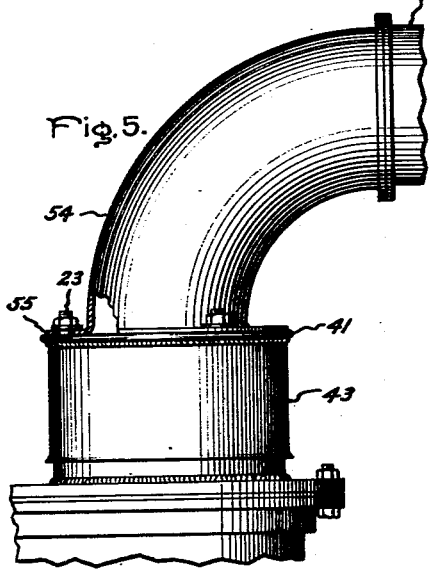
Fig. 5.
Inventor:
Magnus Unger,
by Harry E. Dunham
His Attorney.

Patented July 28, 1942

2,291,360

UNITED STATES PATENT OFFICE 2,291,360

PRESSURE RELIEF DEVICE

Magnus Unger, Pittsfield, Mass., assignor to General Electric Company, a corporation of New York Application May 22, 1940, Serial No. 336,595

5 Claims. (Cl. 220—89)

The present invention relates to pressure relief devices and while it is not necessarily limited thereto it is particularly adaptable to casings for electrical apparatus containing an insulating liquid subject to decomposition under abnormal conditions of operation of the electrical apparatus.

Certain forms of electrical apparatus such as transformers are enclosed within casings which are more or less filled with an insulating liquid such as oil and are frequently gas-tight to prevent the entrance of air, moisture or other foreign substance into the casing which might contaminate the insulating liquid. Upon the occurrence of an abnormal condition of operation of the transformer such as an arc-over under the oil large quantities of gas may be suddenly created as a result of the decomposition of the oil and insulation which must be vented from the casing with maximum rapidity to prevent further injury to the apparatus.

It is an object of the present invention to provide a new and improved pressure relief arrangement for an enclosure which is normally gas-tight and which is operable at relatively low pressures to release large quantities of gas to atmosphere with maximum rapidity. It is a further object of the present invention to provide a new and improved pressure relief device including a frangible diaphragm which is reliable in operation at relatively low gas pressures.

For a better understanding of the invention attention is directed to the following description taken in connection with the accompanying drawing in which Fig. 1 is a cross sectional view of the pressure relief device constructed in accordance with the invention; Fig. 2 is an exploded view in perspective illustrating various elements of the arrangement; Fig. 3 is a perspective view of one part of the device; Fig. 4 is an enlarged fragmentary view in section of one portion of Fig. 1 and Fig. 5 is a view illustrating a second modification of the invention.

Referring now to the drawing the invention is illustrated as applied to an enclosure or casing 10 for electrical apparatus such as a transformer (not shown) and which casing is adapted to contain an insulating liquid such as oil. The cover 11 secured to the casing flange 12 as by bolts 13 in a gas-tight manner, a gasket 14 being arranged therebetween, is provided with a vent opening 15 therethrough. A flange ring 16 is suitably secured as by welds 17 and 18 to the upper surface of the cover 11 around the opening 14. A sheet or disc 21 of relatively flexible and frangible material is secured at its edges between the flange ring 16 and a clamping ring 22 by means of circumferentially arranged bolts 23, a suitable gasket 24 being provided in a cooperating annular recess in the upper face of the flange ring 16 so as to effect a gas-tight seal with the disc 21. While the disc or diaphragm 21 may be of any suitable material I prefer to use a sheet of molded composition commonly known by the trademark name of "Herkolite" because of its desirable oil resistant and other well known characteristics. The opening in the clamping ring is substantially the same diameter as the opening in the flange ring so that upon rupture of the diaphragm 21 a maximum passage is provided for the escaping gases. Across the opening of the clamping ring 22 is a diametrically extending cross bar 25 having a knife edge 26 suitably secured therein at one end thereof which is engaged by the diaphragm upon the occurrence of a predetermined pressure within the casing to facilitate the rupture thereof. An invention relating to pressure relief devices which does not include a knife edge arrangement is described and claimed in a copending application S. N. 336,574, Canfield, filed concurrently herewith, and assigned to the same assignee as this present invention.

In some types of transformers the space above the oil in the casing is filled with an inert gas such as nitrogen which is maintained at a pressure of the order of three or five pounds per square inch so as to produce a slight outward pressure within the casing to further prevent the leakage of air and moisture into the casing through minute unsuspected openings. In other types of sealed transformers the vapor pressure of the insulating liquid above the surface thereof during normal operation of the transformer may rise and fall with variations in ambient temperature through a range of a few pounds per square inch above atmospheric pressure. Such normal working pressures acting upon a thin unsupported diaphragm might cause a fatigue of the diaphragm material and the ultimate rupture thereof even though a pressure corresponding to the setting of the venting arrangement is never reached. In the instant arrangement such premature failure of the diaphragm is prevented by means provided on the opposite sides of the diaphragm so as to limit the flexing movements of the diaphragm during such normal working pressure changes. To limit the inward flexing of the diaphragm, as when the pressure within the casing drops below atmospheric, the flange ring 16 is provided with a plurality of bars 27 extending across the opening thereof, the upper edges of which extend parallel with and closely adjacent the under surface of the diaphragm 21. Arranged above the diaphragm and supported upon the rim 28 of the clamping ring 22 is a cover 29 having a plurality of downwardly extending ribs 30 the lower edges of which form a grid-like surface extending parallel with and closely adjacent to the upper surface of the diaphragm 21 so as normally to prevent excessive upward flexing movements thereof. This grid-like surface extends somewhat below the lower edge of the knife blade in the normal position of the cover 29. Thus the ribs 30 provide a portion which is spaced from the diaphragm when it is in a substantially unflexed condition and engages the diaphragm upon flexure thereof to prevent excessive stressing of the diaphragm and contact with the sharp edge during normal conditions of pressure obtaining within the enclosure. The cover 29 is secured in place by means of a breakable element or pin 31 extending through a central opening 32 in the cover and having a threaded portion 33 screwed into a cooperating hole provided in the crossbar 25 of the clamping ring 22. The pin 31 may be of any suitable material such as aluminum treated so as to be corrosion resistant and is provided with a section 34 of reduced diameter which may be accurately gauged so that it will break at a predetermined relatively low gas pressure acting upon the cover 29 through the diaphragm such as ten pounds per square inch. In screwing the pin 31 into position it is turned only far enough so that the under side of the head barely engages with the cooperating slot of the cover so that no stresses are set up in the pin particularly in the breakable portion 34 thereof. It is to be understood, of course, that sufficient clearance is provided between the cooperating threads of the pin and the hole in the crossbar 25 so that substantially no binding action will take place therebetween and the pin can be screwed freely into position. A lock screw 36 is screwed into a cooperating threaded hole in the cover 29 so that the head thereof overlaps the head of the pin 31 and engages therewith to hold it firmly in place.

Upon the occurrence of a predetermined abnormal gas pressure within the transformer casing such as may be caused by an arc under the surface of the insulating liquid, the diaphragm 21 will exert such a pressure upon the cover 29 tensioning the pin 31 and cause it to break at the portion 34. Depending, of course, upon the gas pressure the cover 29 may fly upwardly with considerable force. To limit the upward travel of the cover 29 are a pair of bars 38 secured edgewise and at right angles with respect to each other across an opening 39 in a ring 41 supported in a spaced relation above the cover 29 in its normal position upon the upper ends of the circumferentially arranged bolts 23. A cylindrical skirt 43 is welded to the peripheral edge of the ring 41 and extends downwardly so as to surround the space between the clamping ring 22 and the ring 41. Above the ring 41 is mounted a roof 44 which is free to move upwardly under the force of the released gas pressure, its upward movement being limited by a plurality of circumferentially arranged guide pins 45 secured at one end to the under surface of the roof 44 and extending through cooperating openings in the ring 41. The guide pins are provided with rubber bumpers 46 at the lower ends thereof acting as stops. In the normal position indicated, the roof 44 substantially closes the opening 39 so as to keep snow and rain from entering into the enclosed space above the cover 29.

The complete rupturing of the diaphragm 21 immediately following the breakage of the relief pin 31 is facilitated by the particular arrangement of the knife edge 26 as disclosed. Many tests were conducted with diaphragm puncturing means of various arrangements and configurations and it was discovered that the radially extending knife edge terminating at a point near the center of the disc performed the designated function completely and with great reliability. The improved performance is principally due to the asymmetrical arrangement of the cutter. When the cover is released by breakage of pin 31 and the diaphragm 21 is permitted to flex upwardly to engagement with the knife edge the bulging diaphragm first engages with the inward corner tip of the knife edge and is punctured thereby. As the diaphragm is forced farther upwardly one side of it is sheared across the remaining length of the knife edge. Due to the high concentration of stress at the tip of the knife edge in the center of the diaphragm it will tear along radially extending lines such as indicated at 49 in Fig. 3. With this knife arrangement it has been found that the breakage of the relief pin 31 is followed substantially instantaneously with a complete rupture of the diaphragm. Furthermore, the rupture of the diaphragm is so complete that practically no portions of it remain extending over the opening to impair the free passage of the gases from the interior of the transformer casing to atmosphere.

Following the breakage of the pin 31 and rupture of the diaphragm 21 the lid 29 will be blown upwardly against the stops provided by the crossbars 38 and the gases escaping around the edges of the cover 29 and through the opening 39 of ring 41 will lift the roof 44 to its limit of travel as determined by its stops. After the gases have escaped to atmosphere the cover 29 will fall back by gravity substantially to its initial position and the roof 44 will return to the position indicated, providing protection from rain or snow entering the tank.

To recondition the pressure relief device, the clamping ring 22 may be removed and a new diaphragm substituted for the ruptured one. The threaded portion of the broken relief pin may be unscrewed by a suitable implement inserted into the small hole 51 provided therethrough just above the threads, the cover 29 replaced and a new relief pin screwed in position substantially as described above.

The pressure relief device described, while suitable for outdoor installation, might be unsuited for indoor use because of the obnoxious nature of the gases vented from the transforming casing.

In Fig. 5 is illustrated a modification of the invention as applied to a transformer mounted indoors. In this instance the movable roof 44 of the preceding modification is omitted and a pipe coupling 54 is substituted therefor having a flange 55 secured to the upper surface of the ring 41 underneath the nuts of the bolts 23. By means of a suitable pipe 56 connected to the coupling 54 the gases vented from the transformer may be conducted to atmosphere exterior of the building within which the transformer may be arranged.

While the pressure relief device has been described in this particular instance as being applied to a transformer casing, it is obvious that it may be applied to any enclosure in which it is desired that the device be gas-tight during normal conditions of pressure obtaining within the enclosure and operable upon a predetermined relatively low pressure above normal to effect venting of the pressure gases with maximum rapidity.

Having described the principle of operation of my invention together with the apparatus which I now consider to represent the best embodiments thereof, I desire to have it understood that the apparatus shown is merely illustrative and that the invention may be carried out by other means.

What I claim as new and desire to secure by Letters Patent of the United States is:

1. A pressure relief arrangement for application to a vent opening of an enclosure, said arrangement comprising a relatively flexible and frangible diaphragm, means for securing said diaphragm around said opening, means fixedly supported with respect to said securing means and having a sharp edge against which said flexible diaphragm may bulge and be punctured thereby upon the occurrence of a predetermined abnormal pressure within said enclosure, a member which in the normal position thereof extends over the outer surface of said diaphragm and having a portion spaced from said diaphragm when it is in a substantially unflexed condition and engaging with said diaphragm for limiting flexure thereof to a predetermined amount during normal conditions of pressure obtaining within said enclosure so as to minimize the possibility of fatigue failure of said diaphragm during said normal conditions of pressure, means including a releasable element for normally securing said member in said normal position, said element being automatically releasable upon the occurrence of said predetermined abnormal pressure applied to said diaphragm to permit said diaphragm to flex into engagement with said sharp edge.

2. In combination with an enclosure having a vent opening, a relatively flexible and frangible disc diaphragm, a clamping ring for securing the edge of said diaphrgam around said opening, means fixed with respect to said clamping ring and having a sharp edge against which said diaphragm may bulge to facilitate a rupture thereof upon the occurrence of a predetermined abnormal pressure within said enclosure, a movable member having a portion spaced from said diaphragm when it is in a substantially unflexed condition and supporting the outer surface of said diaphragm for limiting flexure of said diaphragm to a predetermined amount during normal conditions of pressure obtaining within said enclosure so as to minimize the possibility of fatigue failure of said diaphragm during said normal conditions of pressure, releasable means for holding said member in the diaphragm supporting position, said releasable means being automatically operable upon the occurrence of said predetermined abnormal pressure within said enclosure to permit movement of said member away from said diaphragm whereupon said diaphragm may engage with said sharp edge.

3. In combination with an enclosure having a vent opening in a wall thereof, a relatively frangible diaphragm secured over said opening in a substantially gas-tight relation, means having a sharp edge against which said diaphragm may bulge to facilitate a rupture thereof upon the occurrence of a predetermined abnormal pressure within said enclosure, a member which in the normal position thereof extends over the outer surface of said diaphragm, said member having a portion spaced from said diaphragm when it is in a substantially unflexed condition and engaging said diaphragm upon flexure thereof to prevent excessive stressing of said diaphragm and contact with said sharp edge during normal conditions of pressure obtaining within said enclosure, a breakable pin element for restraining said member in the normal position, said pin being unstressed with no force transmitted thereto through said diaphragm and being responsive to a predetermined abnormal condition of pressure within said enclosure for automatically releasing said member to permit rupture of said diaphragm by said abnormal pressure.

4. In combination with an enclosure having a vent opening in a wall thereof, a relatively frangible diaphragm, means for securing said diaphragm over said opening in a substantially gas-tight relation, said diaphragm being rupturable upon the occurrence of a predetermined abnormal pressure within said enclosure, means when in a normal position spaced from said diaphgram when it is in a substantially unflexed condition and engaging said diaphragm upon movement thereof for limiting the flexure of said diaphragm to a predetermined amount during a predetermined normal pressure range, releasable means for restraining said diaphragm flexure limiting means in said normal position and operating automatically to release said means upon the occurrence of said predetermined abnormal pressure within said enclosure, and a sharp edge fixedly mounted with respect to said diaphragm securing means and positioned within the path of movement of said diaphragm upon said abnormal pressure occurring in said enclosure so as to insure the rupture of said diaphragm upon flexure thereof in response to said predetermined abnormal pressure condition.

5. In combination with an enclosure having a vent opening in a wall thereof, a relatively flexible diaphragm, means for securing said diaphragm over said opening in a substantially gas tight relation, said diaphragm being rupturable upon the occurrence of a predetermined abnormal pressure within said enclosure, means when in a normal position engaging said diaphragm upon movement thereof for limiting the flexure of said diaphragm to a predetermined amount during a predetermined normal pressure range, releasable means for restraining said diaphagm flexure limiting means in a normal position and operating to be automatically released upon the occurrence of said predetermined abnormal pressure within said enclosure, a sharp edge, means fixedly mounting said sharp edge with respect to said diaphragm securing means, said diaphragm securing means having a recessed portion to accommodate said sharp edge within the path of movement of said diaphragm upon said abnormal pressure occurring in said enclosure so as to insure the rupture of said diaphragm upon flexure thereof in response to said predetermined abnormal pressure condition, and means including said knife edge securing means for supporting said releasable means during normal pressure variations.

MAGNUS UNGER.